United States Patent
Roberts et al.

(10) Patent No.: US 9,948,099 B1
(45) Date of Patent: Apr. 17, 2018

(54) IDENTIFYING AND MITIGATING RISK ASSOCIATED WITH WEATHER CONDITIONS

(71) Applicant: International Business Machines Corporation, Armonk, NY (US)

(72) Inventors: Melanie E. Roberts, North Melbourne (AU); Arun Vishwanath, Blackburn (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/279,792

(22) Filed: Sep. 29, 2016

(51) Int. Cl.
| G01W 1/00 | (2006.01) |
| H02J 3/00 | (2006.01) |
| G06N 5/04 | (2006.01) |
| G06N 99/00 | (2010.01) |
| G08B 21/18 | (2006.01) |

(52) U.S. Cl.
CPC ............... H02J 3/00 (2013.01); G06N 5/04 (2013.01); G06N 99/005 (2013.01); G08B 21/182 (2013.01); H02J 2003/007 (2013.01)

(58) Field of Classification Search
CPC .................................................. G06Q 50/06
USPC ............................................... 340/601
See application file for complete search history.

(56) References Cited

U.S. PATENT DOCUMENTS

| 2006/0142961 A1* | 6/2006 | Johnson | G06Q 10/10 |
| | | | 702/61 |
| 2012/0180126 A1* | 7/2012 | Liu | G06F 11/3013 |
| | | | 726/22 |
| 2013/0297242 A1* | 11/2013 | Bartmess | G01R 21/133 |
| | | | 702/61 |
| 2014/0197964 A1* | 7/2014 | Idnani | H04Q 9/00 |
| | | | 340/870.02 |
| 2015/0061895 A1* | 3/2015 | Ricci | H04W 4/22 |
| | | | 340/902 |
| 2015/0331023 A1* | 11/2015 | Hwang | G06Q 10/04 |
| | | | 702/60 |
| 2017/0089625 A1* | 3/2017 | Wallace | F25B 31/00 |

OTHER PUBLICATIONS

NHS Choices, "Heatwave: How to Cope in Hot Weather," http://www.nhs.uk/Livewell/Summerhealth/Pages/Heatwave.aspx, Jun. 27, 2016, 2 pages.
Hon. David Davis MP, "Heatwave Plan for Victoria—Protecting Health and Reducing Harm from Heatwaves," Health Protection Branch, Victorian Government, Department of Health, Aug. 2012, 29 pages.
W. Kleiminger et al., "Household Occupancy Monitoring Using Electricity Meters," UbiComp, Sep. 7-11, 2015, 12 pages, Osaka, Japan.

* cited by examiner

Primary Examiner — Kevin Kim
(74) Attorney, Agent, or Firm — Louis J. Percello; Ryan, Mason & Lewis, LLP

(57) ABSTRACT

A system to mitigate weather exposure risk includes a processor operatively coupled to memory. The processor is configured to generate predicted energy consumption based on a model for expected energy usage in response to detection of a weather event, and compare the predicted energy consumption data with energy consumption data. An alert is generated based at least in part on the comparison, and the alert is sent to one or more entities over one or more networks via one or more delivery methods.

20 Claims, 5 Drawing Sheets

US 9,948,099 B1

IDENTIFYING AND MITIGATING RISK ASSOCIATED WITH WEATHER CONDITIONS

BACKGROUND

Temperature waves, such as heat waves and cold waves, represent one of the leading natural disaster related causes of death in many developed nations around the globe. In the United States, for example, there are around 175 annual heat wave related fatalities. The heat wave that struck Europe in 2003 has itself been linked to over 70,000 fatalities. Despite the deadly effects of heat waves, they are often absent from discussions regarding emergency disasters and intervention. Heat waves disproportionately impact vulnerable people, including the elderly, infirm, young, and those lacking adequate shelter or temperature control systems. Access to cooling systems (e.g., air conditioning systems) during a heat wave or access to heating systems (e.g., central heating systems) during a cold wave may be the difference between life and death for those who are at-risk to these temperature waves. However, vulnerable people may be unable to use these temperature control systems due to incapacitation (e.g., fatigue, mobility issues, etc.), due to financial constraints, or due to lack of access to such temperature control systems in their homes.

SUMMARY

Illustrative embodiments of the invention provide techniques for identifying and mitigating risk associated with a weather condition. While illustrative embodiments are well-suited to identifying and mitigating risk associated with an extreme weather condition, alternative embodiments may be implemented.

For example, in one illustrative embodiment, a system to mitigate risk associated with weather conditions comprises at least one processor operatively coupled to memory. The at least one processor is configured to generate predicted energy consumption based on a model for expected energy usage in response to detection of a weather event, and compare the predicted energy consumption data with energy consumption data. An alert is generated based at least in part on the comparison, and the alert is sent to one or more entities over one or more networks via one or more delivery methods.

For example, in another illustrative embodiment, a method for mitigating risk associated with weather conditions comprises generating predicted energy consumption based on a model for expected energy usage in response to detecting a weather event, and comparing the predicted energy consumption data with energy consumption data. At least one alert is generated based at least in part on the comparison, and the at least one alert is sent to one or more entities over one or more networks via one or more delivery methods.

For example, in another illustrative embodiment, an article of manufacture to mitigate risk associated with weather conditions comprises a computer-readable storage medium for storing computer-readable program code which, when executed, causes a computer to generate predicted energy consumption based on a model for expected energy usage in response to detection of a weather event, and compare the predicted energy consumption data with energy consumption data. An alert is generated based at least in part on the comparison, and the alert is sent to one or more entities over one or more networks via one or more delivery methods.

DETAILED DESCRIPTION

In illustrative embodiments, techniques are provided for identifying and mitigating risk associated with weather conditions. More particularly, illustrative embodiments provide data analytics techniques to predict electricity load to sustain a healthy temperature during periods of extreme weather (e.g., during a heat wave or a cold wave). As will be explained, the illustrative embodiments advantageously leverage smart meter data to predict the electricity load.

Conventional extreme weather warning systems identify geographies, typically at the granularity of suburbs or local government areas, which could be at risk. These warning systems urge households to be prepared for evacuation when the announcement is made by the relevant agencies. These recommendations are, however, not personalized on the granularity of household level.

Figure 1:
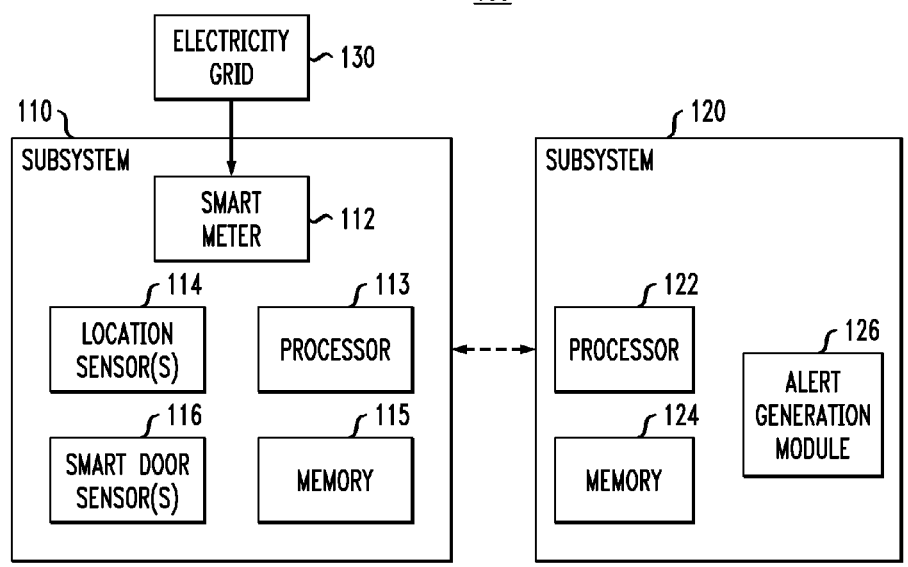
FIG. 1 depicts a block diagram illustrating an overview of a system configured to identify and mitigate risk associated with an extreme weather condition, according to an embodiment of the invention.

With reference to FIG. 1, a block diagram is provided illustrating a system for mitigating weather condition risk 100, in accordance with an embodiment of the invention. System 100 may be interpreted as being comprised of two "subsystems," including subsystem 110 and subsystem 120. Although subsystems 110 and 120 are depicted in FIG. 1 as being individual subsystems of system 100, this depiction is purely exemplary for the ease in description. For example, subsystems 110 and 120 may be alternatively be embodied within a single combination, or as a combination of sub-combinations of subsystems.

In one embodiment, subsystem 110 comprises components within a building, such as a dwelling. For example, subsystem 110 may comprise one or more Network of Things (NoT) components, or primitives. In one embodiment, the NoT is an Internet of Things (IoT). IoT is an instantiation of a NoT in which the components of the NoT are tethered to the Internet. The one or more NoT components may comprise one or more sensors, one or more aggregators, one or more communication channels, one or more external utilities (eUtilities) and at least one decision trigger. Generally speaking, a sensor may be defined as an electronic utility that measures one or more physical properties. An aggregator may be defined as a software implementation based on one or more mathematical functions that transform raw data into aggregated data. A communication channel may be defined as a medium by which data is transmitted (e.g., physical via Universal Serial Bus (USB), wireless, wireless, wired, verbal, etc.). An eUtility may be defined as a software or hardware product or service that executes processes or feed data into the overall workflow of a NoT (e.g., database, mobile device, software or hardware system, cloud, computer, CPU, etc.). A decision trigger may be defined as a conditional expression that triggers an action needed to satisfy the purpose, specification and requirements of the NoT.

As shown in the illustrative embodiment of FIG. 1, subsystem 110 comprises components including smart meter 112, information sensor(s) 114, smart door sensor(s) 116, at least one processor 113 and memory 115. In one embodiment, information sensor(s) 116 and smart door sensor(s) 118 have Internet access capability. The arrangement of the components of subsystem 110 depicted in FIG. 1 is not to be considered limiting.

In one embodiment, information sensor(s) 114 comprise one or more smart location sensors configured to obtain identification and/or location data. For example, an information sensor may be configured to be wearable on an occupant of the building. A smart location sensor is an electronic device that monitors the location of the target subject in real-time or near real-time. The smart location sensor may provide substantially precise information about where an occupant is situated within the dwelling, as opposed to just binary information indicating whether or not the dwelling is occupied. For example, an elderly person who lives in the building may choose to wear a smart location sensor in order to monitor a location of the elderly person in real-time or in near-real time. The information derived from the smart location sensor may be communicated to one or more other devices locally or non-locally. Examples of sensors that may be used to monitor the location of a target subject include, but are not limited to, radio-frequency identification (RFID) tags and location data obtained from a device associated with the user, such as a smartphone, tablet, etc. (e.g., GPS coordinate data).

Smart door sensor(s) 116 is an electronic device that is configured to record the opening and closing of doors. These doors may be, for example, entrance doors to a building (e.g., dwelling), internal doors within the building, or doors to appliances within the building (e.g., a refrigerator door). The information communicated by smart door sensor(s) 116 may be used locally to control related systems. For example, the information communicated by smart door sensor(s) 116 may include information pertaining to the opening and closing of one or more doors in order to dynamically adjust temperature control settings. Additionally, this information may be communicated to linked systems and integrated with additional information. For example, an alert may be triggered if the front door of the building is opened during specified hours, but the internal lights are not activated. Door activity data associated with smart door sensor(s) 116 may be correlated with additional data using a learning model or model to infer occupancy. Accordingly, smart door sensor(s) 116 may be configured to support real-time or near real-time occupancy monitoring.

Smart meter 112 is shown in communication with electrical grid 130. A smart meter is an electronic device that records energy consumption data and communicates the energy consumption data back to a utility for monitoring and billing. For example, a smart meter may be configured to record the energy consumption data in scheduled intervals (e.g., every minute or every hour). The temporal scale by which the smart meter is configured to record the energy consumption data should be sufficiently fine for implementation in accordance with the embodiments described herein. A smart meter may include one or more real-time or near real-time sensors, and may provide power outage notification, power quality monitoring, and two-way communication with the utility. Accordingly, a smart meter may be configured to support real-time or near real-time energy monitoring functionality.

Energy consumption data obtained from meter 112 may be correlated with additional data using a "learning" model, or model. The additional data may comprise a comfortable indoor temperature associated with one or more specific individuals or occupants of the dwelling. The additional data may further comprise data related to occupant demographic, age, health status, etc. In one embodiment, the model may be used to predict energy consumption for the dwelling. A statistical modeling process, such as a machine learning algorithm, Gaussian process, etc. may be used to train the model to offer better energy consumption predictions over time. For example, the model may be updated in response to changes in energy consumption, changes in occupants (e.g., demographics, ages, and health status), etc.

In one embodiment, system 100 is configured to determine the comfortable indoor temperature as a function of one or more variables. For example, the one or more variables may comprise one or more of ambient temperature, occupant demographic(s), age, health status, or any other related variable. In one embodiment, the one or more variables are weighted. For example, a variable may be multiplied by a respective weight value in order to prioritize certain variables in the determination of the comfortable indoor temperature.

System 100 may be configured to support a single occupant scenario, or a multiple occupant scenario. In other words, the comfortable indoor temperature may be computed for a single occupant, or may be computed for occupants associated with different demographics. In the single occupant scenario, the comfortable indoor temperature may be calculated by a function comprising the following inputs: {A×ambient temperature, B×demographic, C×age, D×health status, . . . }, where A, B, C and D are weights assigned to the ambient temperature, demographic, age and health status, respectively. In the multiple occupant scenario, each variable associated with a respective occupant may be assigned its own weight. For example, the demographic, age, health status, etc. of each occupant may be assigned its own weight. In other words, in the multiple occupant scenario, the comfortable indoor temperature may be calculated as a function comprising the following inputs: {A×ambient temperature, $B_i$×demographic$_i$, $C_i$×age$_i$, $D_i$×health status$_i$, . . . }, where A represents the weight assigned to the ambient temperature, and $B_i$, $C_i$, and $D_i$ are weights assigned to the demographic, age and health status corresponding to the i-th occupant, respectively. An exemplary a function that may be used to calculate the appropriate indoor temperature is:

$$15\left(1+\frac{h}{6}\right)+2g+$$

$$(5+h)\sin\left(\frac{\pi(t-2)}{24}\right)\times\left\{\text{If } a>40, \text{then}\left(\frac{80-a}{80}\right)+\frac{1}{2}, \text{else } 1\right\}+$$

$$\left\{\text{If } a < 40, \text{then}\left(\frac{1}{a-40}\right), \text{else } 1\right\}$$

where a is the age (in years) of the occupant, g represents gender and can be 1 if the occupant is of a first gender type and 0 if not of the first gender type, h∈[0,1] representing a health status (e.g., 1 may represent a person in good health), and t is the hour of the day. Further details regarding the creation of the models are described herein with reference to FIG. 2.

In one embodiment, subsystem 120 comprises a computer system or server. For example, as shown, subsystem 120 may comprise processor 122, memory 124, and alert generation module 126. Alert generation module 126 operates to generate an alert for delivery to one or more entities during an extreme weather event (e.g., an extremely hot day) based on data obtained from subsystem 110. In one embodiment, energy consumption data obtained by meter 112 may be compared to predicted energy consumption data obtained via the model, and an alert may be generated based on the comparison. For example, the alert may be generated in response to a difference in the energy consumption and the predicted energy consumption exceeding a threshold. In an alternative embodiment, subsystem 110 is configured to perform an additional step to determine if the dwelling is occupied, and alert generation module 126 is configured to generate an alert if both the difference in the energy consumption and the predicted energy consumption exceeds a threshold, and the dwelling is occupied.

In one embodiment, smart meter 112, information sensor(s) 114 and smart door sensor(s) 116 send their data directly to subsystem 120. In an alternative embodiment, subsystem 110 is configured to aggregate or compile data from smart meter 112, information sensor(s) 114 and smart door sensor(s) 116, and send the aggregated data to subsystem 120.

The generated alert serves as information relating to an at-risk occupant of the dwelling. The one or more entities that may receive the generated alert may include appropriate parties, such as the occupant, a family member or other relative, a friend, a landlord, or any other party that may want to be notified. The one or more entities may further include one or more emergency services that may be dispatched to rescue an at-risk person during an extreme weather event. In one embodiment, the alert is sent to the one or more entities via at least one delivery method. For example, the alert may be sent to one or more entities via one or more of application, or app alert (e.g., push notification), text, e-mail, phone call with a pre-defined message, etc. An app alert is an alert associated with an application installed on a device, such as a smartphone or tablet. The app alert may include, for example, one or more of a visual alert, vibrational alert and a sound alert. Further details regarding the process of alert generation are described herein with reference to FIG. 3.

In one embodiment, subsystem 120 is configured to incorporate social context data for generating and/or sending alerts. The social context data may be derived from various sources that include, but are not limited to, credit card transactions, health records, social media data, IoT sensor data (e.g., from connected devices), phone transactions, e-mail data, wearable fitness or health devices, and implantable health devices (e.g., an insulin pump).

In one embodiment, subsystem 120 is configured to incorporate the social context data by utilizing the social context data as an input to the model for expected energy usage and safe temperatures. For example, if credit card transactions indicate that the occupant has made purchases at the local pharmacy on two out of the past three days, a health score associated with the occupant may be adjusted downward. Such an adjustment may correspond to a change in a safe temperature range and hence the expected energy usage.

In on embodiment, the social context data may be used to determine the alert and the manner of the alert. For example, the social network data may indicate that a first user is well-connected with a second user. If the first user is observed to be using his or her expected energy and the second user is not observed to be using his or her expected energy, an alert may be sent to the first user indicating that the second user is not using his or her expected energy. That is, during an extremely hot day or an extremely cold day, an alert may be sent to the first user indicating that the second user may be residing in a dangerous dwelling. The alert may further include a suggestion to invite the second user over to share in the first user's temperature-controlled home.

Figure 2:
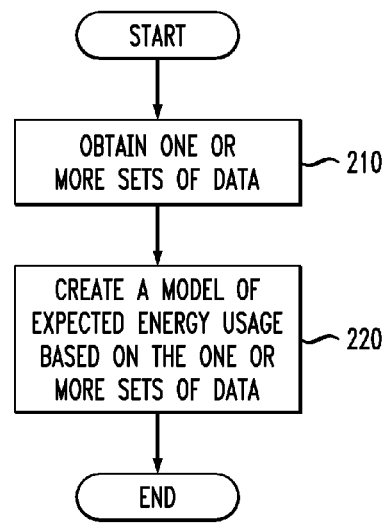
FIG. 2 depicts a flow chart illustrating a process for creating a model of expected energy usage, according to an embodiment of the invention.

The system of FIG. 1 is configured to mitigate weather condition risk, in real-time or near real-time, by generating an alert in response to an extreme weather event. With reference to FIG. 2, flow diagram 200 is provided illustrating a process for mitigating weather condition risk. At step 210, one or more sets of data are obtained. In one embodiment, the one or more sets of data may include a set of historical electricity usage data, a set of socio-economic data, a set of demographic data and a set of historical weather data. It is to be understood and appreciated that set of historical electricity usage data, set of socio-economic data, set of demographic data and set of historical weather data are not to be considered limiting.

The set of historical electricity usage data may be obtained from a smart meter. For example, the set of historical electricity usage data may comprise a historical electricity usage data obtained from a smart meter for an individual. Additionally, the set of historical electricity usage data may further comprise historical electricity usage data obtained from a smart meter for like individuals. The set of demographic data may include data relating to the demographic of individuals living in a dwelling. For example, the set of demographic data may indicate a single demographic dwelling, or may indicate a multiple demographic dwelling.

At step 220, a model of expected energy usage is created based on the one or more sets of data. In one embodiment, the model of expected energy usage is a function of one or more variables. For example, the model of expected energy usage may be a function of ambient temperature, humidity, etc. In one embodiment, the model of expected electricity usage is specific to a dwelling and its occupants. For example, the model of expected electricity usage may be specific to a single demographic dwelling, or a multiple demographic dwelling. The model of expected electricity usage may adjusted to account for typical use, which may be affected by the energy efficiency of the lifestyle of the occupants, electrical equipment of the dwelling, etc. In one embodiment, creating the model of expected electricity usage comprises using a statistical modeling process. For example, the model may be created via a machine learning process, a Gaussian process, etc.

Figure 3:
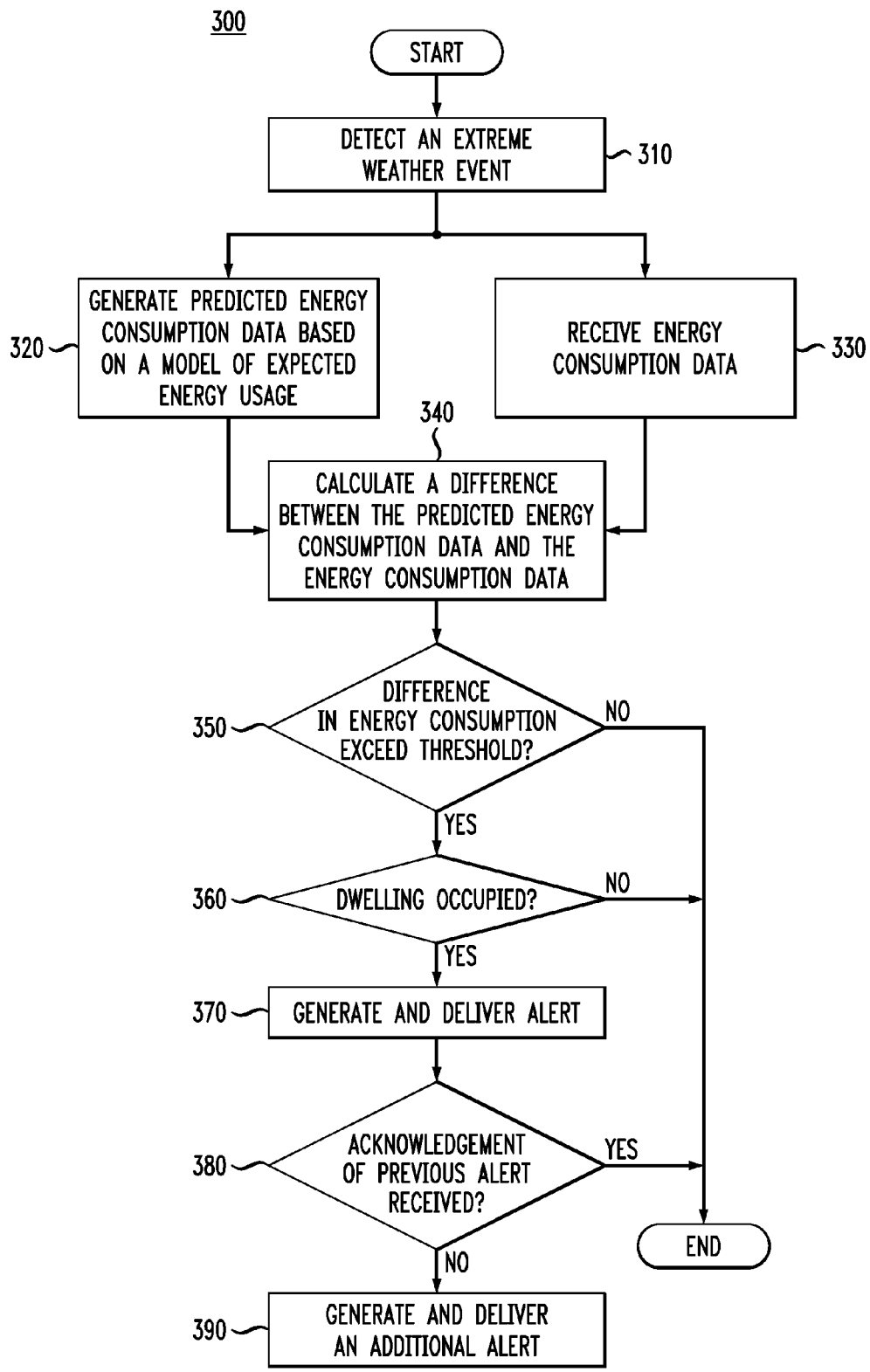
FIG. 3 depicts a flow chart illustrating a process for identifying and mitigating risk associated with an extreme weather condition, according to an embodiment of the invention.

The model of expected energy usage may be used to send a warning that a person may be at risk during an extreme weather event, such as extreme heat or extreme cold. With reference to FIG. 3, a flow chart 300 is provided illustrating a process for mitigating risk during a weather event, such as an extreme weather event. At step 310, a weather event is detected. At step 320 predicted energy consumption data is generated based on the model of expected energy usage, and at step 330, energy consumption data (e.g., electricity usage data) is received. In one embodiment, the energy consumption data comprises real-time stream of electricity usage data. The real-time stream of energy consumption data may be obtained via one or more smart meters associated with the dwelling.

At step 340, a comparison between the predicted energy consumption data and the energy consumption data is performed by calculating a difference between the predicted energy consumption data and the energy consumption data.

At step 350, it is determined if the difference exceeds a threshold. The threshold may be determined based on alert criteria. The alert criteria may indicate, for example, that an alert is generated when the difference between the load associated with the electricity usage data and the load estimated by the model of expected energy usage exceeds 5%. In one embodiment, the alert criteria is a function of the demographics of the dwelling. The alert criteria may be set manually by the end user, or by using pre-defined rules.

If the difference does not exceed the threshold, the process reverts back to step 330. In one embodiment, if the difference does exceed the threshold, it is determined at step 360 if the dwelling is currently occupied. For example, the resolution of smart meter data may not be as fine-grained as that of a real-time or near real-time location sensor to automatically determine if the dwelling is occupied or not. If the dwelling is determined to be unoccupied, the process reverts back to step 320. However, if the dwelling is determined to be occupied, the process goes to step 370 to generate and send an alert to one or more entities. The one or more entities may include appropriate parties, such as a family member or other relative, a friend, a landlord, or any other party that may want to be notified. In one embodiment, the alert is sent to the one or more entities via at least one delivery method. For example, the alert may be delivered to one or more entities via one or more of app alert (e.g., push notification), text, e-mail, phone call with a pre-defined message, etc. In one embodiment, the alert may be sent to the one or more entities in accordance with one or more pre-defined rules. The pre-defined rules may determine the one or more entities, the at least one delivery method, etc.

In one embodiment, at step 380, it is determined if an acknowledgement of a previous alert is received. If the acknowledgement is received, the process ends since the warning has been successfully broadcast to the one or more entities. However, if the acknowledgment is not received, a secondary or additional alert may be generated and sent to the one or more entities at step 390. In one embodiment, the additional alert may be sent to the one or more entities via the at least one delivery method. The additional alert may be sent to the one or more entities in accordance with one or more pre-defined rules. The pre-defined rules may comprise the same pre-defined rules discussed above in step 370, or may comprise different pre-defined rules from the pre-defined rules discussed above in step 370.

Figure 4:
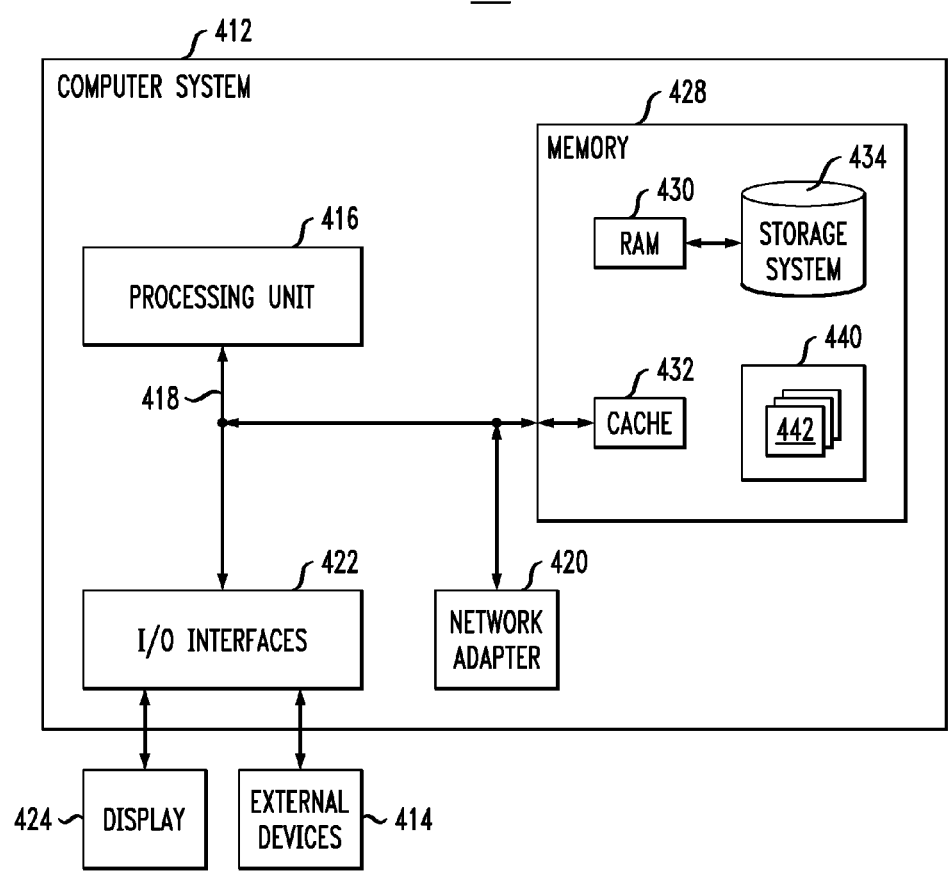
FIG. 4 depicts a computer system in accordance with which one or more components/steps of techniques of the invention may be implemented, according to an embodiment of the invention.

One or more embodiments can make use of software running on a computer or workstation. With reference to FIG. 4, in a computing node 410 there is a system/server 412, which is operational with numerous other general purpose or special purpose computing system environments or configurations. Examples of well-known computing systems, environments, and/or configurations that may be suitable for use with system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

System/server 412 may be described in the general context of computer system executable instructions, such as program modules, being executed by a computer system. Generally, program modules may include routines, programs, objects, components, logic, data structures, and so on that perform particular tasks or implement particular abstract data types. System/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, system/server 412 is shown in the form of a computing device. The components of system/server 412 may include, but are not limited to, one or more processors or processing units 416, system memory 428, and bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 412 typically includes a variety of computer system readable media. Such media may be any available media that is accessible by system/server 412, and it includes both volatile and non-volatile media, removable and non-removable media.

The system memory 428 can include computer system readable media in the form of volatile memory, such as random access memory (RAM) 430 and/or cache memory 432. System/server 412 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces.

As depicted and described herein, memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

System/server 412 may also communicate with one or more external devices 414 such as a keyboard, a pointing device, an external data storage device (e.g., a USB drive), display 424, one or more devices that enable a user to interact with system/server 412, and/or any devices (e.g., network card, modem, etc.) that enable system/server 412 to communicate with one or more other computing devices. Such communication can occur via I/O interfaces 422. Still yet, system/server 412 can communicate with one or more networks such as a LAN, a general WAN, and/or a public network (e.g., the Internet) via network adapter 420. As depicted, network adapter 420 communicates with the other components of system/server 412 via bus 418. It should be understood that although not shown, other hardware and/or software components could be used in conjunction with system/server 412. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
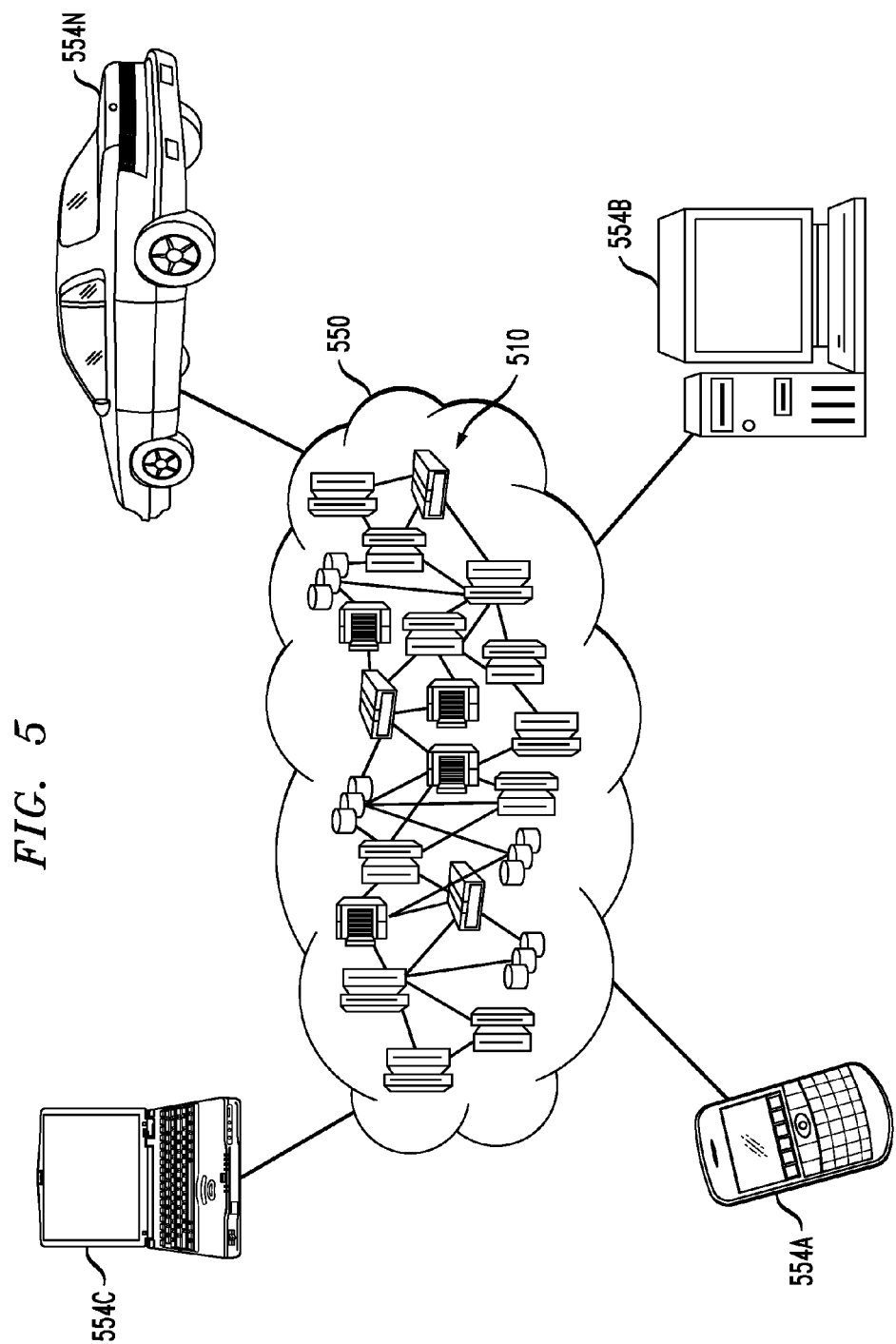
FIG. 5 depicts a cloud computing environment, according to an embodiment of the invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
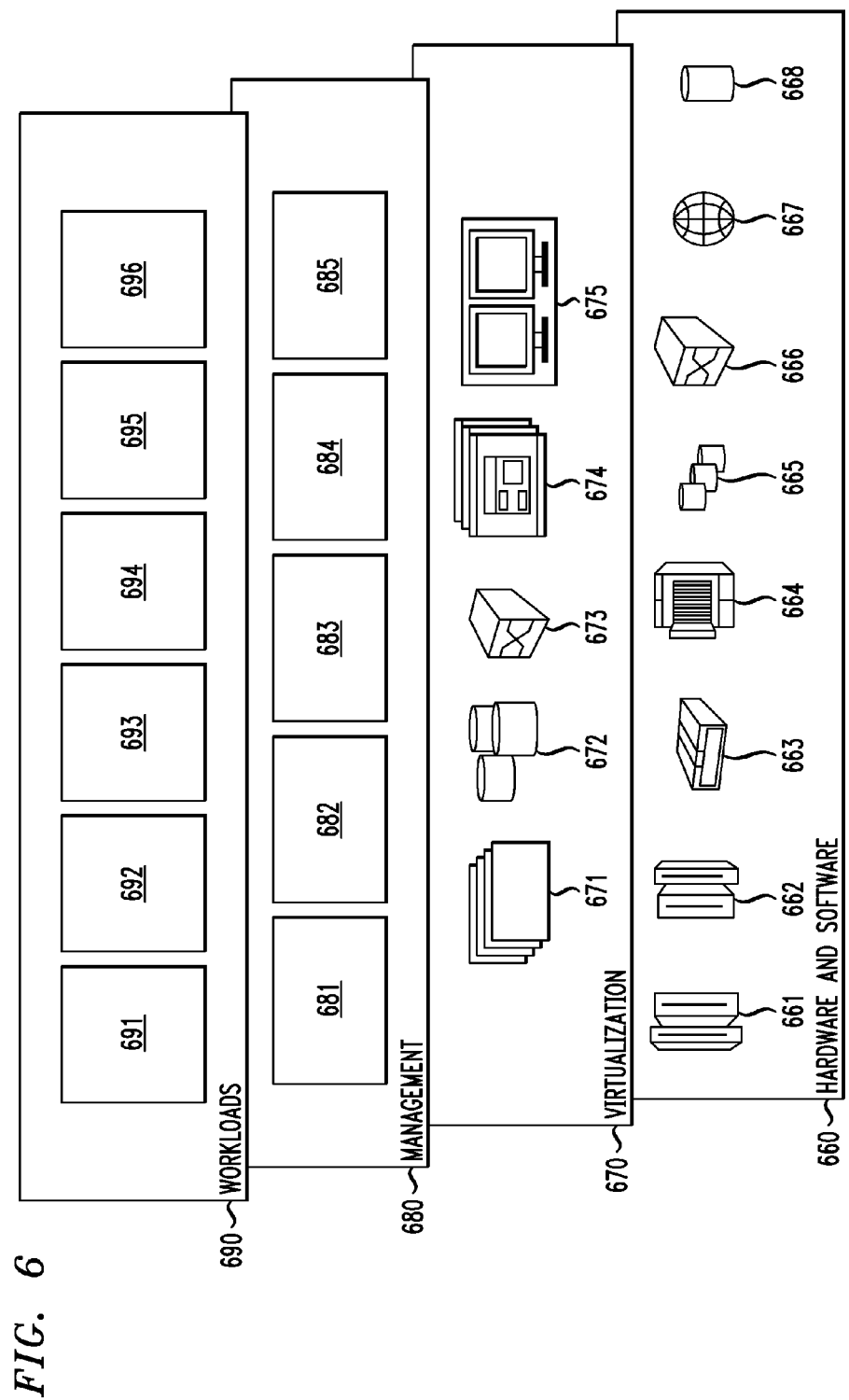
FIG. 6 depicts abstraction model layers, according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and extreme weather monitoring 696, which may perform various functions described above.

The embodiments described herein advantageously provide for alert generation during an extreme weather event, such as extreme heat, extreme cold, etc. . . . . . For example, the embodiments described herein advantageously leverage data obtained from a smart meter, among other data, to determine whether or not a person may be at-risk during the extreme weather event. The alert may be generated in real-time, or near real-time, based on a comparison of energy consumption with predicted energy consumption. Advantageously, the predicted energy consumption may be obtained from a model of expected energy consumption. The model of expected energy consumption may be customized based on data corresponding to one or occupants of a dwelling. Taking such personalized occupant data into consideration advantageously provides for autonomous alert generation tailored to a specific dwelling. The embodiments described herein can allow for an adjustment of the model based on changes in energy consumption and/or characteristics of the dwelling over time, thereby refining the alert generation process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system comprising:
   at least one processor operatively coupled to at least one memory;
   wherein the at least one processor is configured to:
   in response to detection of a weather event, generate predicted energy consumption data based on a model of expected energy usage;
   compare the predicted energy consumption data with energy consumption data, wherein the energy consumption data comprises energy consumption data obtained via at least one meter associated with the at least one network;
   generate at least one alert based at least in part on the comparison; and
   send the at least one alert to one or more entities over one or more networks via one or more delivery methods;
   wherein the processor is further configured to create the model for expected energy usage based on sets of data comprising a set of historical energy usage data, a set of socio-economic data, a set of demographic data, and a set of historical weather data, wherein the model for expected energy usage is created as a function of one or more variables.

2. The system of claim 1, wherein the creation of the model comprises a use of a statistical modeling process selected from the group consisting of: machine learning and Gaussian.

3. The system of claim 1, wherein the comparison comprises a calculation of a difference between the predicted energy consumption data and the energy consumption data, and wherein the at least one alert is generated in response to the calculated difference exceeding a threshold.

4. The system of claim 3, wherein the threshold is determined based on one or more pre-defined rules.

5. The system of claim 1, wherein the at least one delivery method is determined in accordance with one or more pre-defined rules.

6. The system of claim 1, wherein the processor is further configured to deliver at least one additional alert to the one or more entities via the at least one delivery method in response to a failure to receive an acknowledgment of at least one previous alert.

7. A computer-implemented method comprising:
   in response to detecting a weather event, generating predicted energy consumption data based on a model for expected energy usage, wherein the model for expected energy usage is created based on sets of data comprising a set of historical energy usage data, a set of socio-economic data, a set of demographic data, and a set of historical weather data, and further wherein the model for expected energy usage is created as a function of one or more variables;
   comparing the predicted energy consumption data with energy consumption data, wherein the energy consumption data comprises energy consumption data obtained via at least one meter associated with the at least one network;

generating at least one alert based at least in part on the comparison; and sending the at least one alert to one or more entities over one or more networks via one or more delivery methods.

8. The method of claim 7, wherein creating the model comprises using a statistical modeling process selected from the group consisting of: machine learning and Gaussian.

9. The method of claim 7, wherein the comparison comprises calculating a difference between the predicted energy consumption data and the energy consumption data, wherein the at least one alert is generated in response to the calculated difference exceeding a threshold.

10. The method of claim 9, wherein the threshold is determined based on one or more pre-defined rules.

11. The method of claim 7, wherein the at least one delivery method is determined in accordance with one or more pre-defined rules.

12. The method of claim 7, further comprising delivering at least one additional alert to the one or more entities via the at least one delivery method.

13. The method of claim 12, wherein the at least one additional alert is delivered to the one or more entities in response to failing to receive an acknowledgment of at least one previous alert.

14. An article of manufacture comprising a computer-readable storage medium for storing computer-readable program code which, when executed, causes a computer to:

in response to detection of a weather event, generate predicted energy consumption data based on a model for expected energy usage, wherein the model for expected energy usage is created based on sets of data comprising a set of historical energy usage data, a set of socio-economic data, a set of demographic data, and a set of historical weather data, and further wherein the model for expected energy usage is created as a function of one or more variables;

compare the predicted energy consumption data with energy consumption data, wherein the energy consumption data comprises energy consumption data obtained via at least one meter associated with the at least one network;

generate an alert based at least in part on the comparison; and send the at least one alert to one or more entities over one or more networks via one or more delivery methods.

15. The system of claim 1, wherein the set of historical energy usage data is a set of historical electricity usage data.

16. The computer-implemented method of claim 7, wherein the set of historical energy usage data is a set of historical electricity usage data.

17. The article of manufacture of claim 14, wherein the set of historical energy usage data is a set of historical electricity usage data.

18. The article of manufacture of claim 14, wherein creating the model comprises using a statistical modeling process selected from the group consisting of: machine learning and Gaussian.

19. The article of manufacture of claim 14, wherein the comparison comprises calculating a difference between the predicted energy consumption data and the energy consumption data, wherein the at least one alert is generated in response to the calculated difference exceeding a threshold.

20. The article of manufacture of claim 14, further comprising delivering at least one additional alert to the one or more entities via the at least one delivery method.

* * * * *